G. F. ECKERT.
CAR BRAKE-SHOE.
No. 179,176. Patented June 27, 1876.
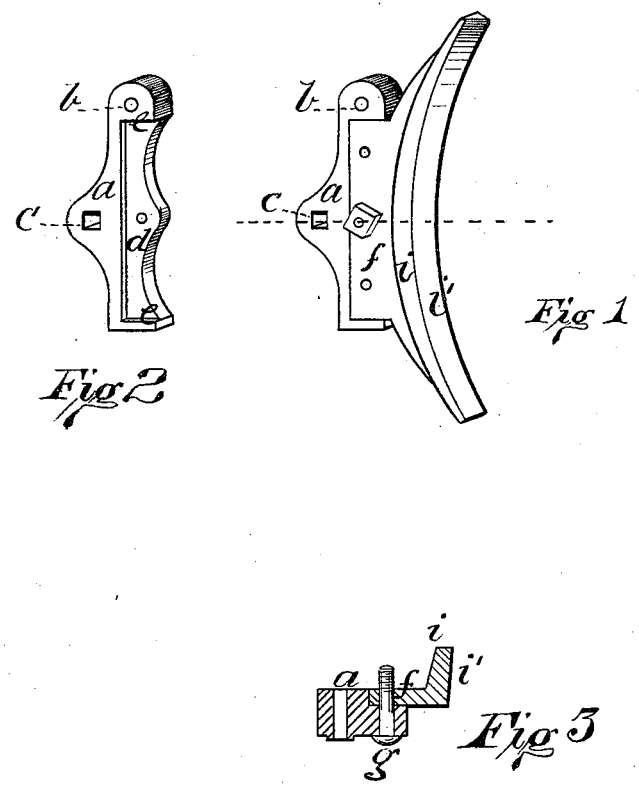

UNITED STATES PATENT OFFICE.

GEORGE F. ECKERT, OF CINCINNATI, OHIO.

IMPROVEMENT IN CAR-BRAKE SHOES.

Specification forming part of Letters Patent No. 179,176, dated June 27, 1876; application filed April 20, 1876.

*To all whom it may concern:*

Be it known that I, GEORGE F. ECKERT, of Cincinnati, Ohio, have invented a new and useful Improvement in Car-Brakes; and I do hereby declare that the following is a full, clear, and exact description thereof, reference being had to the accompanying drawings, and to the letters of reference marked thereon.

Figure 1 is a perspective view of my improved car-brake. Fig. 2 is a perspective view of the shoe, and Fig. 3 is a central transverse section of the shoe and rubber united.

My invention relates to that class of car-brakes in which the rubber is detachable from the shoe; and it consists in providing a lateral seat in the shoe, and in the combination of a flanged reversible rubber having a laterally-projecting bearing-flange with a pendent shoe provided with a side recess for the seat of the flange of the rubber, as hereinafter more fully described.

The object of my invention is to provide a car-brake in which the rubber may be readily attached and removed, and which may be reversed vertically in position, so as to work upon either the tread or the flange of the car-wheel; also, be changed from the right to the left side of the truck, and vice versa.

In the drawings, $a$ denotes the pendent shoe to be held, by the hole $b$ at its upper end, from a hanger. The square hole $c$ is for the insertion of the end of the horizontal brake-bar, such as now used, and which will connect the shoes to be hung opposite to the truck-wheels at each side of the car. To securely hold the shoe without the use of several fastenings, which require much time for removal when the rubber is to be reversed or replaced by a new one, I have constructed the seat $d$ in the side of the shoe with the shoulders $e$ $e$, into which seat the flange $f$ of the rubber snugly fits, and is securely held by the single bolt $g$.

The seat $d$ is so formed in the side of the face of the shoe that the rubber may be quickly seated and removed laterally without detaching the shoe or removing the shoe from its pendent position.

The seat may be of dovetail form, instead of rectangular, and the flange $f$ of the rubber may be made of corresponding shape, to fit the seat.

By the use of the laterally-projecting rubber $i$, my improved brake may be applied to the brake supporting and operating mechanism which is now in use, without alterations, so as to cause the beveled face $i'$ of the rubber to work in contact with the tread of the car-wheel without coming in contact with the flange of the wheel.

By reversing the rubber in the seat of the shoe—that is, changing it end for end—it will bear against the flange of the wheel.

By changing the rubber to the opposite side of the car, when partly worn out, and reversing its position, will cause it to wear equally and uniformly upon its face, thereby making it more durable.

When the brake-bar which connects a pair of the shoes $a$, which are "rights and lefts," is made of suitable length, the rubber may be reversed end for end without changing it from one side of the car to the other, in order to make it work against the tread of the wheel, which will cause the flange $i$ to occupy the same plane with the shoe, instead of projecting laterally, as represented in Fig. 3.

The rubber can be easily attached and detached in the manner specified, and, instead of the single bolt, $g$, a key, button, or clamp may be used to secure the flange of the rubber in its seat.

Having described my improved car-brake, I claim and desire to secure by Letters Patent—

1. The shoe $a$, provided with the seat $d$ $e$ in its side, substantially as and for the purpose described.

2. The detachable reversible rubber, provided with flange $f$ and laterally-projecting flange $i$, in combination with the shoe $a$, as and for the purpose described.

Witness my hand this 11th day of April, A. D. 1876.

GEORGE F. ECKERT.

Witnesses:
H. P. K. PECK,
ALLEN R. CURSO.